US006188687B1

(12) United States Patent
Mussman et al.

(10) Patent No.: US 6,188,687 B1
(45) Date of Patent: Feb. 13, 2001

(54) BROADBAND SWITCH THAT MANAGES TRAFFIC AND METHOD THEREFOR

(75) Inventors: Harry Edward Mussman, Bedford; Stephen S. Liu, Acton, both of MA (US); Hung-San Chen, San Jose, CA (US)

(73) Assignee: Verizon Laboratories Inc., Waltham, MA (US)

( * ) Notice: Under 35 U.S.C. 154(b), the term of this patent shall be extended for 0 days.

(21) Appl. No.: 09/000,908

(22) Filed: Dec. 30, 1997

Related U.S. Application Data

(63) Continuation-in-part of application No. 08/347,618, filed on Nov. 30, 1994.

(51) Int. Cl.$^7$ .................................................. H04L 12/64
(52) U.S. Cl. ......................... 370/388; 370/360; 370/486
(58) Field of Search .................................. 370/360, 380, 370/387, 388, 410, 907, 354, 367, 485, 486, 487; 348/7, 12

(56) References Cited

U.S. PATENT DOCUMENTS

| | | | | |
|---|---|---|---|---|
| 3,825,690 | * | 7/1974 | Kelly et al. | 370/374 |
| 4,912,700 | * | 3/1990 | Maddern et al. | 370/388 |
| 5,436,890 | * | 7/1995 | Read et al. | 370/360 |
| 5,940,738 | * | 8/1999 | Rao | 348/7 |

OTHER PUBLICATIONS

Samalam et al., The Broadband Customer Service Module (B–CSM): An Access and Switching Module Serving SONET OC–12 Fiber Lines, IEEE, pp. 244–248, 1993.*
Harry Mussman, "The Broadband Customer Service Module," Access, GTE's Technology Magazine, Spring 1993.
Harry Mussman et al., The Broadband Customer Service Module (B–CSM) : An Access . . . Fiber Lines, Globecom, Nov. 30, 1993.
Lloyd R. Linnell, A Wide–Band Local Access System Using . . . Components, IEEE J. on Selected Areas in Comms., vol. SAC–4, #4, (Jul. 1986) pp. 612–618.
Steven Minzer, "A Signaling Protocol . . . Services," IEEE J. on Selected Areas in Comms., vol. 9, #9 (Dec. 1991), pp.1383–1394.
Michael Cooperman et al., "Broadband Video Switching," IEEE Communications Magazine, vol. 27, #12, Dec. 1989.
Andreas Weber et al., "Multichannel Circuit Switching—Networks," IEEE J. on Selected Areas in Comms., vol. 9, #2 (Feb. 1991) pp. 226–232.

* cited by examiner

Primary Examiner—Chi H. Pham
Assistant Examiner—Frank Duong
(74) Attorney, Agent, or Firm—Leonard Charles Suchyta

(57) ABSTRACT

A network (10) includes a broadband customer service module (B-CSM) (20). The B-CSM (20) includes a plurality of feeder interface cards (FICs) (36) and optical line cards (OLCs) (38) which are coupled together through a midplane assembly (34) so that each FIC (36) couples to all OLCs (38) and each OLC (38) couples to all FICs (36) through junctor groups (68). A reference clock which oscillates at a frequency slower than the data rate is routed with payload data so that it receives delays similar to those imposed on the payload data due to processing. At second stage switching fabrics (50) where data need to be extracted from signals flowing within the B-CSM (20), a clock regeneration circuit (32) generates a master clock signal oscillating at twice the data rate and phase synchronized to a delayed reference clock. A geometric compensation scheme corrects for timing skew which occurs when clocks and data are distributed to points or small areas from widely dispersed locations, and when clocks and data are distributed from points or small areas to widely dispersed locations. The B-CSM (20) ranks the junctor groups (68) according to signal occupancy and manages signal traffic to efficiently utilize the FICs (36) and to reduce the probability of signal blocking. The junctor groups (68) can include a number of bidirectional junctors. The bidirectional junctors are configured to carry upstream or downstream signals according to current upstream and downstream signal traffic volume.

20 Claims, 9 Drawing Sheets

BROADBAND SWITCH THAT MANAGES TRAFFIC AND METHOD THEREFOR

RELATED APPLICATION

This application is a Continuation-In-Part of "Data Transferring Circuit Which Aligns Clock and Data," by Harry E. Mussman et al., Ser. No. 08/347,618, filed Nov. 30, 1994.

TECHNICAL FIELD OF THE INVENTION

The present invention relates generally to systems which process digital data. More specifically, the present invention relates to the high speed processing of synchronous data, such as may occur in a switch for a broadband network.

BACKGROUND OF THE INVENTION

Networks transfer electronic information between different locations. Broadband networks differ from other networks in that they transfer a relatively large amount of information during each unit of time. Future broadband networks are expected to convey video signals for business, educational and residential applications. Such networks may provide services such as broadcast-like video distribution, individual access to video program libraries, video telephone, video conferencing, and the like. Any one of such services may, for example, communicate signals having data transfer rates of up to 50 Mb/s or more.

In order to effectively serve a large number of customers, a broadband network includes switching nodes. At switching nodes, broadband signals are routed along selected paths so that desired signals are delivered from signal sources to targets.

Numerous problems are faced by a broadband, real-time switch that accommodates a large number of connections. These problems result, at least in part, from the high data transfer rates associated with broadband communications. In short, a tremendous amount of data need to be processed or otherwise transferred through the switch during every unit of time, and the larger the number of connections supported by the switch, the greater the amount of data which need to be processed.

A practical broadband switch should be able to efficiently support a variety of communication services, whether or not such services require unidirectional or bidirectional signal traffic. For example, although unidirectional broadcast-like services are currently available, bidirectional services such as video conferencing and other interactive services that utilize point-to-point connections may be in high demand in the near future. Unfortunately, switching systems designed to efficiently handle broadcast-like communications may not be capable of efficiently supporting bidirectional signal traffic, and vice versa. Such systems may not be able to adapt to long term trends in upstream and downstream signal traffic demand. In addition, conventional network switches may not be able to adapt to large or rapid variations in the amount of upstream versus downstream traffic.

An adaptable network switch may require less switching hardware than a rigidly designed switch having equivalent switching capabilities. A reduction in the number of physical components is desirable to conserve space and to lower engineering, manufacturing, and maintenance costs. For example, given a specific mix of upstream and downstream switching capacities, a switching circuit that adapts to upstream and downstream traffic volume requires fewer components than an equivalent switching circuit that employs a fixed number of upstream circuits and a fixed number of downstream circuits. If the actual volume of upstream and downstream traffic is not proportional to the respective number of fixed upstream and downstream circuits, then the circuits are not optimally allocated and switching capacity is wasted.

Switching capacity is also wasted when communication signals are delivered to a network switch without being requested from a downstream customer. Switching circuits become busy with signal traffic and the probability of blocking increases when signals are unnecessarily brought down to the network switch. The frequency of signal blocking can also increase if traffic volume is not evenly distributed among unoccupied or sparsely-occupied switching circuits. In addition, switching speed may be sacrificed if the network switch distributes signal traffic in a random or unstructured manner.

SUMMARY OF THE INVENTION

Accordingly, it is an advantage of the present invention that an improved broadband network switch is provided.

Another advantage of the present invention is that it provides a broadband switch that efficiently supports a variety of communication services.

A further advantage is that the present invention provides a broadband network switch that can adapt to large or rapid variations in upstream and downstream signal traffic.

Another advantage is that a broadband switch is provided that utilizes flexible switching circuits and switching processes.

A further advantage of the present invention is that a broadband switch that allocates upstream and downstream switching circuits according to upstream and downstream traffic demand is provided.

Another advantage of the present invention is that a method of operating a broadband switch is provided that efficiently manages and distributes signal traffic through the broadband switch.

Another advantage is that the probability of signal blocking is reduced in the broadband switch.

The above and other advantages of the present invention are carried out in one form by a method of operating a switching circuit to manage communication signal traffic. The method involves performing first stage switching in a first plurality of switching modules and performing second stage switching in a second plurality of switching modules. Each of the first switching modules is coupled to all of the second switching modules and the first and second switching modules are in data communication through a plurality of junctors. The method also involves directing communication signals through the junctors in response to upstream and downstream signal traffic volume.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF THE PREFERRED EMBODIMENTS

Figure 1:
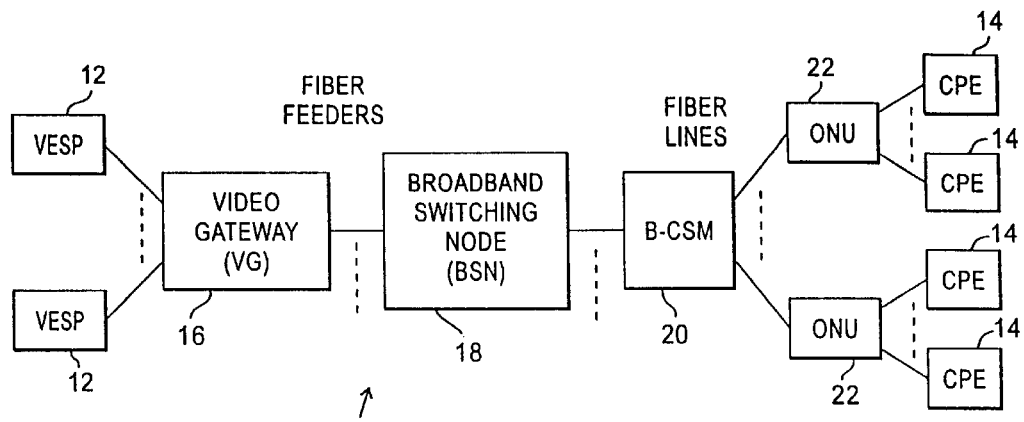
FIG. 1 shows a block diagram of a broadband network with which a broadband customer service module (B-CSM) configured in accordance with the present invention may operate.

FIG. 1 shows a block diagram of a broadband network 10. Any number of video enhanced service providers (VESPs) 12 and any number of customer premise equipment (CPE) 14 may couple to and communicate through network 10. VESPs 12 may, for example, provide broadcast-like video services, where video from a single source is "broadcast" to many targets, or VESPs 12 may provide video program libraries which customers may access on demand. Such broadcast-like services are expected to be in high demand, and in the preferred embodiments network 10 accommodates a greater amount of downstream traffic (i.e. toward CPEs 14) than upstream traffic (i.e. away from CPEs 14). Network 10 primarily transports digital data. Conventional codex equipment (not shown) may be used to convert NTSC-compatible and HDTV video into digital streams.

VESPs 12 couple to network 10 through one or more video gateways 16. Gateways 16 couple through any number of broadband switching nodes 18 to any number of broadband customer service modules (B-CSMs) 20, and B-CSMs 20 couple to CPEs 14 through optical network units (ONUs) 22.

Network 10 is a fiber optic network, with optical signals being demultiplexed and converted into electrical signals (and vice versa) in ONUs 22. ONUs 22 couple to CPEs 14 through coax cables, and each ONU 22 serves a few, for example three, CPEs 14 for each optical line. Fiber optic lines couple ONUs 22 to B-CSMs 20, and fiber optic feeders couple B-CSMs 20 to upstream network nodes, such as switching nodes 18. In the preferred embodiment, the fiber optic lines and feeders conform to well known SONET OC-12 protocols. In a preferred embodiment, each B-CSM 20 may serve up to 288 fiber lines, with each line conveying 12 STS-1 51.84 Mb/s channels. In addition, each B-CSM 20 may support up to 288 SONET OC-12 downstream feeders and up to 72 SONET OC-12 upstream feeders. Accordingly, B-CSMs 20 may accommodate a large number of connections, with STM circuit switching being performed at an STS-1 rate. Although B-CSM 20 is configured for compatibility with STM signals, nothing prevents B-CSM 20 from utilizing ATM protocols for call processing and/or circuit switching of ATM signals.

Signaling from CPEs 14 to network 10 is accomplished via a SONET datacom channel in the line operating at around 576 Kb/s using a variation of the Q.921 and Q.931 protocols. The variations of the Q.931 protocol included in network 10 include a MODIFY message to which B-CSM 20 responds with an acknowledgment and often without further network involvement. The MODIFY message applies when a customer is currently receiving a broadcast-like video program channel. It specifies a new broadcast-like video program channel to receive. When B-CSM 20 receives a MODIFY message from a CPE 14, it controls its switching circuits to route the new video program channel to the CPE 14 and then returns an acknowledgment after the new video program channel has been connected. Switching time improves because this process is quicker than the conventional disconnect sequence of messages followed by the conventional connect sequence of messages. Also, the switching time often improves because further network involvement such as rebuilding a new connection can often be omitted if the new channel is already available at a B-CSM 20, having already been provided by the network to the B-CSM 20 for connection to another CPE 14. When the new channel is already available at the B-CSM 20, the B-CSM 20 routes it to the CPE 14 from the switching circuit that is most closely associated with the CPE 14 so as to minimize the switching circuit resources that are used to make the connection.

While the teaching of the present invention may apply to different types of nodes in network 10, the following description focuses upon a preferred embodiment of a B-CSM 20. B-CSM 20 may be viewed as analogous to a local switching system or a remote local switching module for the current voice network because B-CSM 20 in network 10 is the first switch away from customer equipment in a hierarchy of switches.

Figure 2:
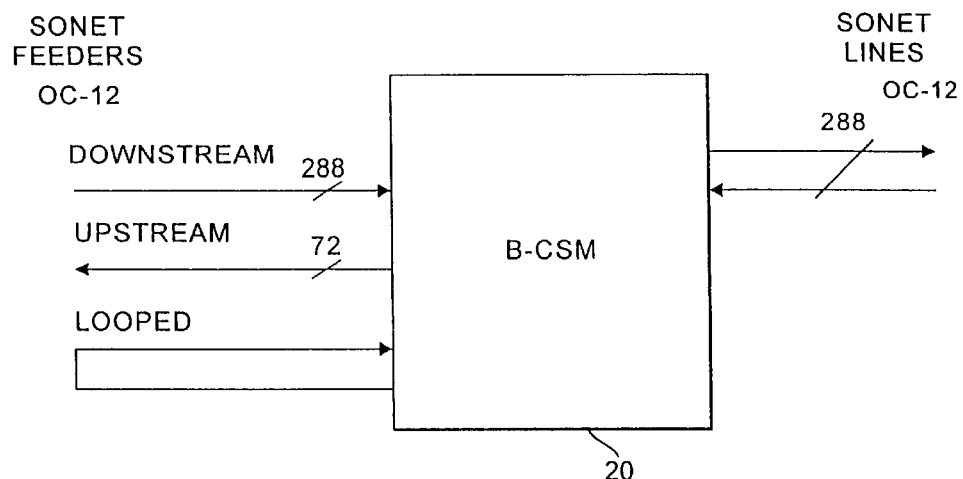
FIG. 2 shows a block diagram depicting an external configuration for the B-CSM.

FIG. 2 shows a block diagram depicting an external configuration for the preferred embodiment of B-CSM 20. Up to 288 OC-12 SONET bidirectional fiber lines may couple B-CSM 20 to various ONUs 22 (see FIG. 1). Up to 288 downstream OC-12 SONET fiber feeders and up to 72 upstream OC-12 SONET fiber feeders may couple B-CSM 20 to various broadband switching nodes 18 (see FIG. 1), or other upstream network nodes. However, a portion of the upstream feeders may be looped back to downstream feeders at B-CSM 20 so that line-to-line connections may be switched entirely within B-CSM 20. Even if upstream feeders are not looped back to downstream feeders, line-to-line connections downstream of B-CSM 20 may take place through looping which may take place further upstream.

Figure 3:
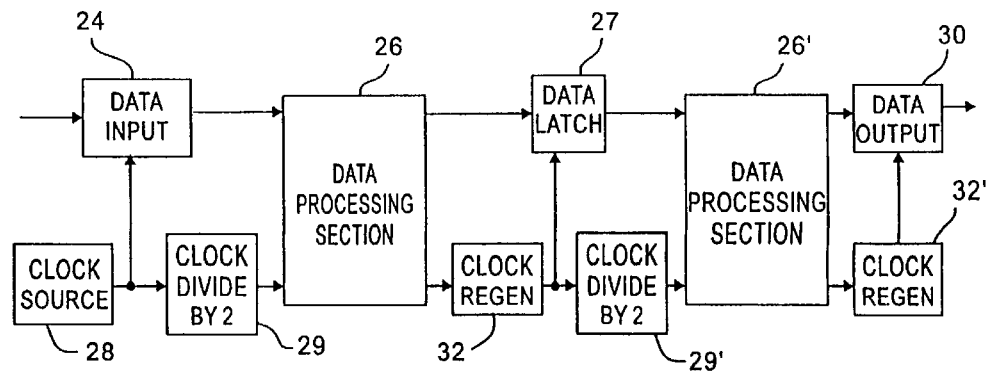
FIG. 3 shows a high level block diagram of the B-CSM.

FIG. 3 shows a high level block diagram of a B-CSM 20. As illustrated in FIG. 3, B-CSM 20 has data inputs 24 at which SONET data from a SONET line are received and demultiplexed into individual STS-1 data streams. These data are passed to data processing sections 26 and 26', each of which processes the data and imposes some delay on the data as a consequence, although not necessarily an intended or desired consequence, of the processing. B-CSM 20 also has data outputs 30 at which multiplexed STS-1 data streams are received and multiplexed into SONET data for a SONET line. As discussed above, B-CSM 20 includes data inputs for both upstream and downstream directions. In the preferred embodiment of the present invention, the data processing corresponds to circuit switching, and more precisely to circuit switching which takes place in a two stage space switch arrangement, with the two stages corresponding to data processing sections 26 and 26', respectively. Portions of input data are switched into portions of output data.

However, other types of data processing activities also impose delays while processing data and can benefit from the teaching of the present invention.

A clock source 28 produces a full-rate clock which oscillates at a frequency which is the same as the data rate. In other words, the full-rate clock undergoes one full cycle between high and low states in one datum period, baud, or symbol. The full-rate clock is used to clock data out of the data inputs 24, and it connects to a clock divide by two circuit 29 which produces a half-rate clock reference. In the preferred embodiment, this half-rate clock reference oscillates at one-half the data rate so that it resembles an alternating stream of ones and zeros occurring at the data rate. In other words, the reference clock changes state only once for each datum period, baud, or symbol. This arrangement contrasts with conventional digital circuits where clocks may operate at a data rate, change state twice per datum period, baud, or symbol, and operate as a clock for the data streaming through a processor at the data rate. Clock divide by two circuit 29 couples to the input of data processing section 26, where the reference clock joins the data from data input 24. Then, data processing section 26 processes the reference clock along with the input data so that the reference clock receives approximately the same delay imposed upon the data.

In the preferred embodiment, data processing section 26 is implemented using standard CMOS design practices. The data rate is STS-1, or 51.84 Mb/s. The reference clock's frequency is 25.93 Mc/s so that the reference clock is a stream of alternating ones and zeros at the STS-1 rate.

A data output of data processing section 26 couples to a data latch 27 so that the processed and delayed, and in this case the switched, data are presented to an input of a data latch 27. The delayed clock reference output from data processing section 26 couples to a clock regeneration (CLOCK REGEN) circuit 32. Clock regeneration circuit 32 is a phase locked loop circuit that regenerates a master clock signal which is at twice the frequency of the data rate and is phase synchronized to the delayed reference clock. This master clock couples to a clock input of data latch 27 so that the master clock clocks the processed data into data latch 27. By having the reference clock and the data experience approximately the same delays through data processing section 26 and by regenerating a master clock from the delayed reference clock, bit synchronization for extracting data at data latch 27 may be maintained.

This data transfer process from data input 24 through data processing section 26 to data latch 27 is repeated from data latch 27 through data processing section 26' to data output 30. Once again, a half-rate clock reference is created by a clock divide by two circuit 29' and carried through data processing section 26' along with the data. A full-rate master clock is then regenerated by clock regeneration circuit 32'.

Figure 4:
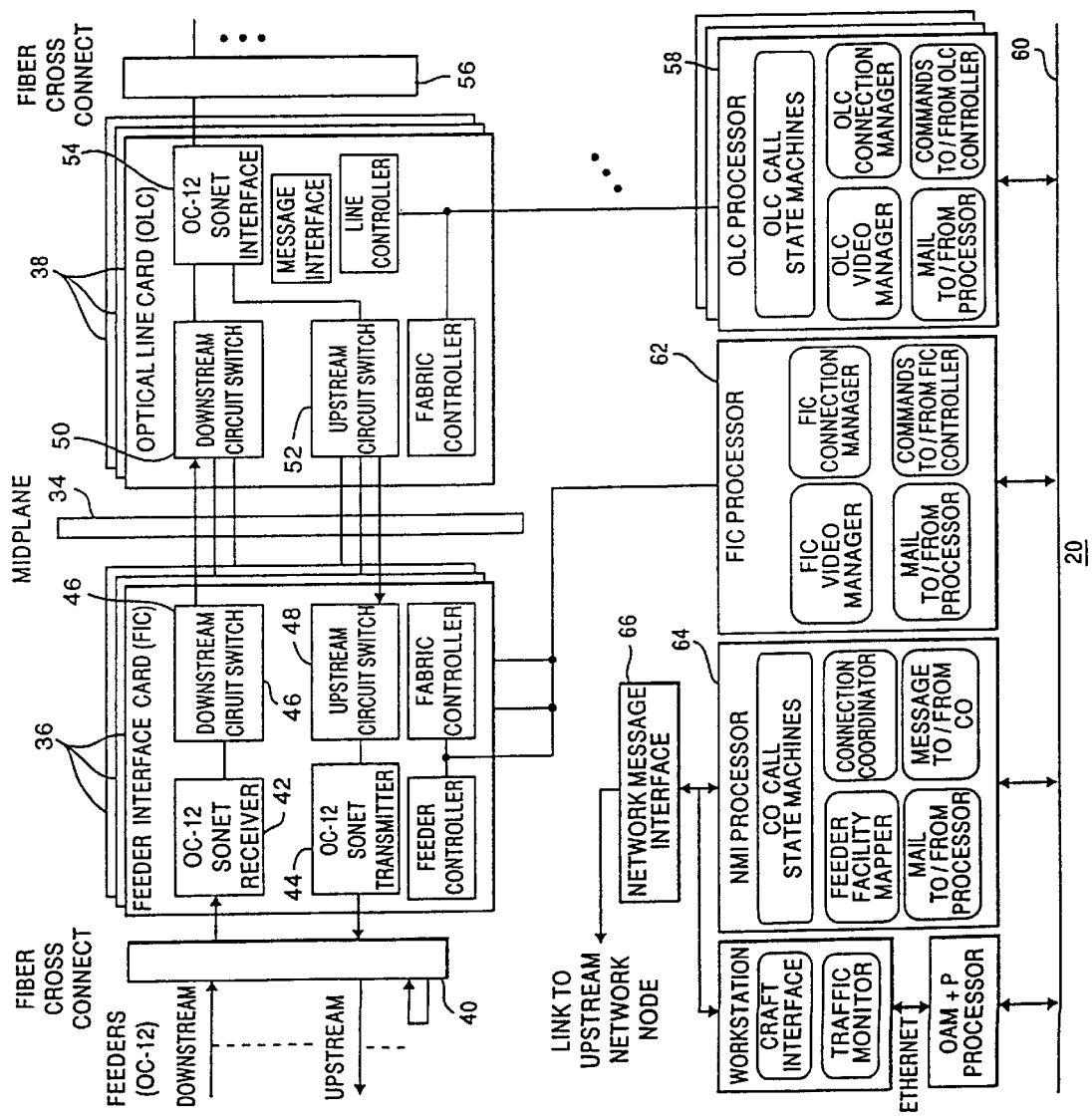
FIG. 4 shows a more detailed block diagram of the B-CSM.

FIG. 4 shows a more detailed block diagram of B-CSM 20. B-CSM 20 is configured upon a midplane assembly 34 which arranges a plurality of feeder interface cards (FICs) 36 substantially perpendicular to a plurality of optical line cards (OLCs) 38. Each FIC 36 couples to every OLC 38 at connection points through junctor groups between the FIC 36 and respective OLCs 38. Likewise, each OLC 38 couples to every FIC 36 at connection points through junctor groups.

Downstream feeders couple through a fiber cross connect 40 to OC-12 SONET receivers 42 on each FIC 36. In a preferred arrangement, each feeder is coupled to a plurality of FICs 36. This arrangement facilitates the efficient management of signal traffic by providing a number of different signal paths through B-CSM 20. In addition, the redundant feeder-to-FIC connection provides at least one back up connection if one of FICs 36 should fail. OC-12 SONET transmitters 44 on each FIC 36 couple through cross connect 40 to upstream feeders. Receiver 42 and transmitter 44 couple through downstream and upstream circuit switch fabrics 46 and 48 and midplane assembly junctor groups to downstream circuit switch fabrics 50 and upstream circuit switch fabrics 52, respectively. Downstream and upstream circuit switches 50 and 52 on OLCs 38 couple through an OC-12 SONET interface 54 and a fiber cross connect 56 to the ONU 22 downstream lines (see FIG. 1). Those skilled in the art will appreciate that for downstream signals, switch fabrics 46 provide first stage switching and switch fabrics 50 provide second stage switching. Likewise, for upstream signals, switch fabrics 52 provide first stage switching and switch fabrics 48 provide second stage switching. Of course, between each first stage and second stage numerous junctors connect many switch fabrics to many other switch fabrics.

In the preferred embodiment, midplane assembly 34 supports up to 18 of FICs 36 and up to 18 of OLCs 38. Up to 9072 junctors perform the interconnections between switching stages. Each FIC 36 is desirably identical to the other FICs 36, and each OLC 38 is desirably identical to the other OLCs 38. Thus, for design, manufacturing, inventory, engineering, troubleshooting, and maintenance, cost savings result from having fewer modules with which to contend. These junctors are arranged into up to 324 junctor groups. Each junctor group may support up to 24 downstream junctors and 4 upstream junctors. In one embodiment, the junctors are bidirectional (i.e., capable of carrying upstream or downstream signals) and the directionality of the junctors is controlled in response to the volume of upstream and downstream signal traffic. Bidirectional junctors are described in detail below.

OLC processors 58 couple to corresponding OLCs 38 through, for example, well known VSB busses. Likewise OLC processors 58 couple to a multiprocessor bus 60, such as the well-known VME bus. OLC processors 58 evaluate in-band signaling extracted from SONET lines, and control circuit switching taking place in OLCs 38. Signaling which cannot be resolved within OLC processors 58 and OLCs 38 is packetized and transmitted over bus 60. A FIC processor 62 couples to multiprocessor bus 60 and to all FICs 36. FIC processor 62 controls switching taking place in FICs 36. A network message interface (NMI) processor 64 responds to signaling packets and transfers such signaling upstream through a network message interface 66. OLC and FIC processors 58 and 62 perform switching in accordance with a preferred path management process (described below).

Figure 5:
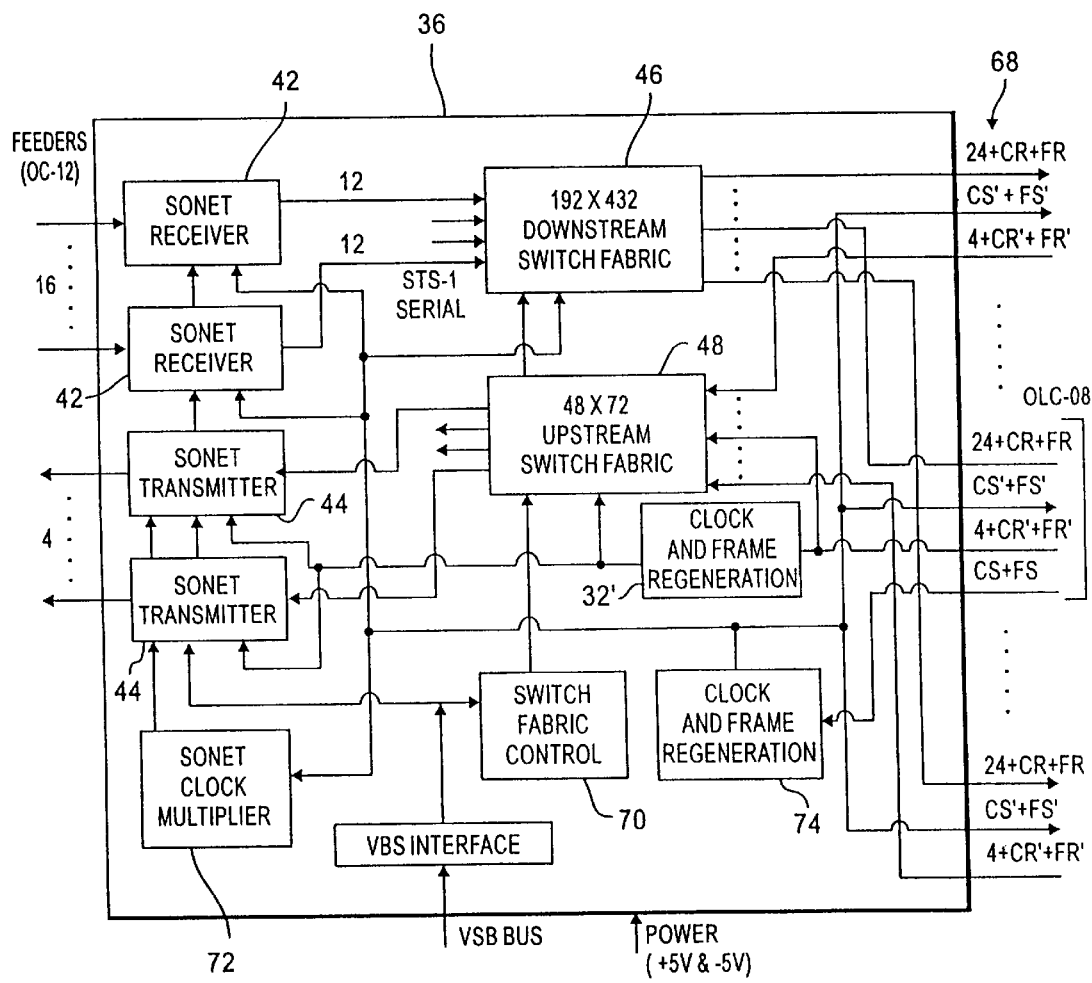
FIG. 5 shows a block diagram of a feeder interface card (FIC)

FIG. 5 presents a block diagram which illustrates a feeder interface card (FIC) 36 in more detail. Each FIC 36 may include several OC-12 SONET receivers 42, up to 16 in the preferred embodiment. Likewise, FIC 36 includes several OC-12 SONET transmitters 44, up to 4 in the preferred embodiment. Receivers 42 demultiplex STS-1 channels from the SONET feeders, convert the data into electrical signals, and couple the individual STS-1 channels to inputs of downstream switch fabric 46, which is configured as a 192×432 fabric in the preferred embodiment. Output signals from switch fabric 46 are routed through junctor groups 68, through which they pass to all OLCs 38 (see FIG. 4).

SONET transmitters 44 multiplex the STS-1 channels they receive from upstream switch fabric 48 into SONET optical signals for transmission over the upstream feeders. In the preferred embodiment, upstream switch fabric 48 is configured as a 48×72 fabric which receives four signals from OLCs 38 through each of 18 junctor groups 68. The configuration of switching occurring through fabrics 46 and 48 from moment to moment is controlled through a switch fabric control block 70, which is controlled by FIC processor 62 (see FIG. 4).

Figure 6:
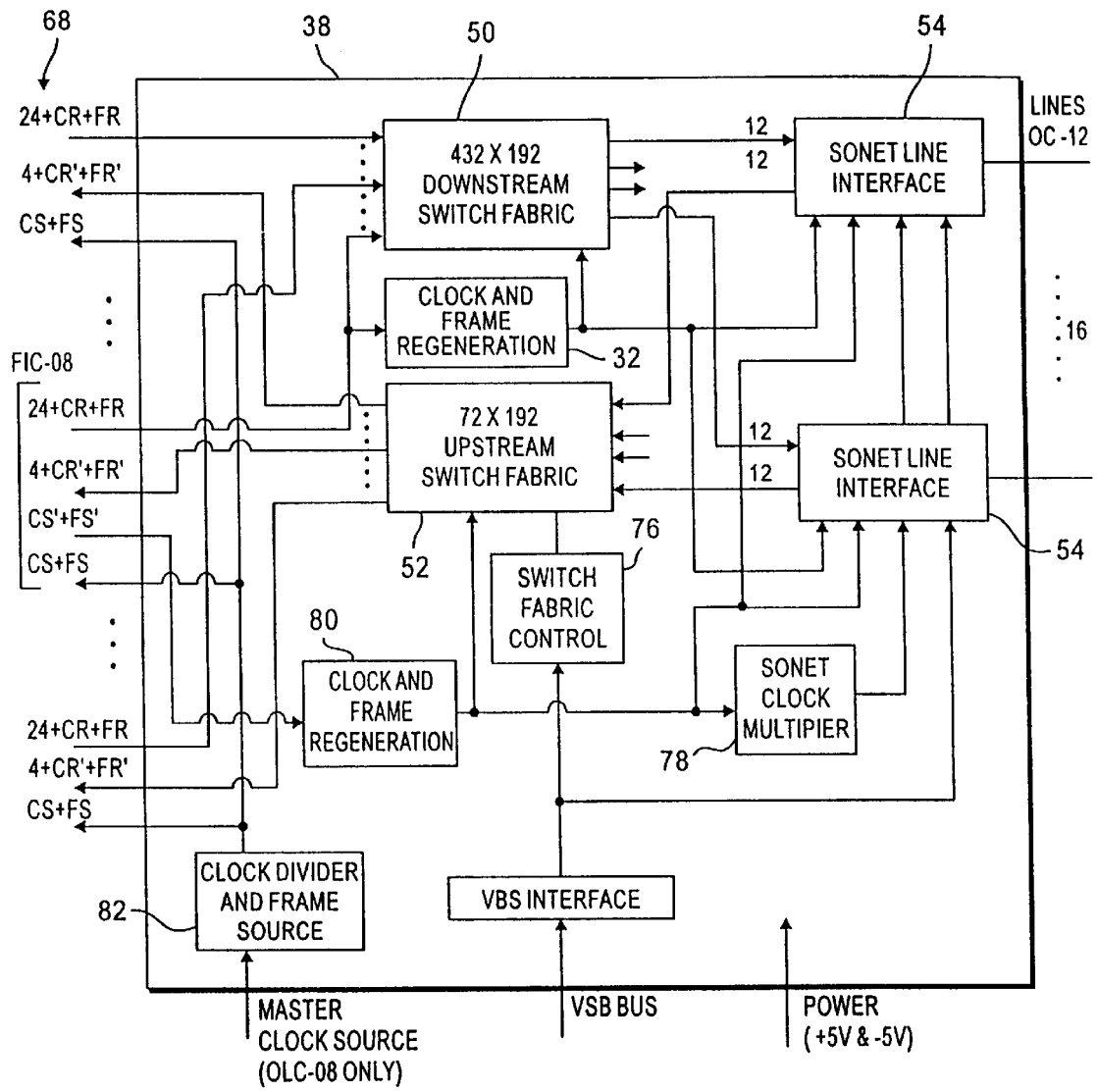
FIG. 6 shows a block diagram of an optical line card (OLC)

FIG. 6 presents a block diagram which illustrates an optical line card (OLC) 38 in more detail. Each OLC 38 may include several OC-12 SONET interfaces 54, up to 16 in the preferred embodiment, for connection to the lines. Interfaces 54 demultiplex STS-1 channels from the SONET lines, convert the data into electrical signals, and couple the received individual STS-1 channels to inputs of upstream switch fabric 52, which is configured as a 72×192 fabric in the preferred embodiment. Likewise, interfaces 54 multiplex electrical STS-1 channels received from downstream switch fabric 50 onto the optical SONET lines. Downstream switch fabric 50 is configured as a 432×192 fabric in the preferred embodiment. Output signals from upstream switch fabric 52 are routed through junctor groups 68, through which they pass to all FICs 36 (see FIG. 4). Input signals from FICs 36 couple through junctor groups 68 to downstream switch fabric 50. The configuration of switching which occurs through fabrics 50 and 52 from moment to moment is controlled by a switch fabric control block 76, which is controlled by an OLC processor 58 (see FIG. 4). In an alternate embodiment that utilizes bidirectional junctors, the directionality of the junctors is controlled by OLC processor 58 and by switch fabric control blocks 70 and 76.

A master clock source (not shown) connects only to the clock divider and frame source circuit 82 on the OLC 38 located in the middle of midplane assembly 34 (see FIG. 4). This centrally located OLC 38 is designated as OLC-08. Circuits 82 are inactive on all other OLCs 38. The master clock source may be synchronized to an external reference source, as is conventional for SONET equipment. Clock divider and frame source circuit 82 outputs a half-rate "clock source" signal CS and SONET "frame source" signal FS to all FICs 36 via the appropriate junctor groups. The SONET frame source signal is used to synchronize when all SONET frames are output from the B-CSM 20 and its position is otherwise arbitrary.

Referring to FIGS. 5 and 6, clock and frame regeneration circuits 74 on all FICs 36 receive the clock source CS and frame source FS signals from OLC-08. On each FIC 36, clock and frame regeneration circuit 74 provides both full rate and half-rate clocks and a frame reference signal (FR), which are distributed to all SONET receivers 42, to downstream switch fabric 46, and to a SONET-clock multiplier 72.

SONET receivers 42 use the full rate clock and the frame reference signal to input or otherwise extract data from SONET OC-12 fibers. As one skilled in the art would understand, SONET pointer-processing functions are done on each STS-1 signal using the frame and pointer as received and the frame reference signal.

Downstream switch fabric 46 uses the full-rate clock to clock-in data from the SONET receivers 42 and to clock it out to OLCs 38 via junctor groups 68. Fabric 46 also distributes the half-rate clock reference signal CR and the frame reference signal FR along with data to each OLC 38 that is connected to its output. The CR, FR and data signals which connect to each OLC are aligned as they leave the downstream switch fabric 46.

SONET clock multiplier 72 multiplies the STS-1 full-rate clock by 12 to give a 622.08 MHz clock which is provided to all SONET transmitters 44. One skilled in the art will understand that SONET transmitters 44 are designed so that the phase of this 622.08 MHz clock can be any stable value.

On the FIC 36 located in the middle of the midplane assembly, designated as FIC-08, clock and frame regeneration circuit 74 also provides half-rate clock CS' and frame source FS' signals to all OLCs 38 via the appropriate junctor groups 68.

A clock and frame regeneration circuit 80 on each OLC 38 receives clock source CS' and frame source FS' signals from FIC-08. On an OLC 38, clock and frame regeneration circuit 80 provides both full-rate and half-rate clocks and a frame reference signal, which are distributed to the receivers in all SONET line interfaces 54, to the upstream switch fabric 52, and to a SONET clock multiplier 78.

Receivers (not shown) in SONET line interfaces 54 use the full rate clock and the frame reference signal to receive or otherwise extract data from SONET OC-12 lines. Those skilled in the art will understand that SONET pointer-processing functions are done on each STS-1 signal using the frame and pointer as received and the frame reference signal.

Upstream switch fabric 52 uses the full rate clock to clock-in data from the receiver in the SONET line interfaces 54 and to clock data out to FICs 36 via junctor groups 68. Upstream switch fabric 52 also distributes the half-rate clock reference signal CR' and the frame reference signal FR' along with data to each FIC 36 which is connected to its output. The CR', FR' and data signals which connect to each FIC 36 are aligned as they leave the upstream switch fabric.

SONET clock multiplier 78 multiplies the full rate clock by 12 to give a 622.08 MHz clock which is provided to all transmitters (not shown) in SONET line interfaces 54. As one skilled in the art can understand, the SONET transmitters are designed so that the phase of this 622.08 MHz clock can be any stable value.

Downstream data signals are input to the B-CSM 20 at SONET receiver 42 on FICs 36, switched first by downstream switch fabrics 46 on FICs 36, switched second by downstream switch fabrics 50 on OLCs 38, and then output from the B-CSM 20 by transmitters in SONET line interfaces 54 on OLCs 38.

In a similar manner, upstream data signals are input to the B-CSM 20 at receivers in the SONET line interfaces 54 on OLCs 38, switched first by upstream switch fabrics 52 on OLCs 38 switched second by upstream switch fabrics 48 on FICs 36, and then output from the B-CSM 20 by SONET transmitter 44 on FICs 36.

Only the processing of downstream data signals will be described below in detail; however, those skilled in the art will understand that the processing of upstream data is done in a similar manner. Referring to FIG. 5, downstream data signals are transferred on each FIC 36 from a SONET receiver 42 to downstream switch fabric 46 using the full rate clock from clock and frame regeneration circuit 74. Downstream data signals are transferred from all downstream switch fabrics 46 on all FICs 36 via junctors to all downstream switch fabrics 50 on all OLCs 38 (see FIG. 6).

Referring to FIG. 6, on each OLC 38 clock and frame regeneration circuit 32 receives the half-rate clock reference signal CR and frame reference signal FR from FIC-08. Circuit 32 regenerates these signals and outputs a full-rate clock and a frame reference signal to downstream switch fabric 50 and to transmitters in all SONET line interfaces 54. Downstream switch fabric 50 uses the full-rate clock to clock-in data from the FICs 36 via the junctors. Transmitters in SONET line interfaces 54 use the full-rate clock to clock-in data from the downstream switch fabric 50 and they use the frame reference signal to set their SONET output framing. Thus, the downstream data signals are transferred on each OLC 38 from downstream switch fabric 50 to all transmitters in SONET line interfaces 54 using the full rate clock from clock and frame regeneration circuit 32.

When downstream data signals are transferred from all downstream switch fabrics 46 in FICs 36 via junctors to a downstream switch fabric 50 on an OLC 38, data signals are aligned with the clock reference signal CR at the input to the downstream switch fabric 50, even though the data and clock reference signals may have traversed different path lengths between the fabrics. Geometric compensation is used to assure that all data signals are aligned with the clock reference signal CR by assuring that the path length for each data or clock signal back to the master clock source is substantially the same.

Figure 7:
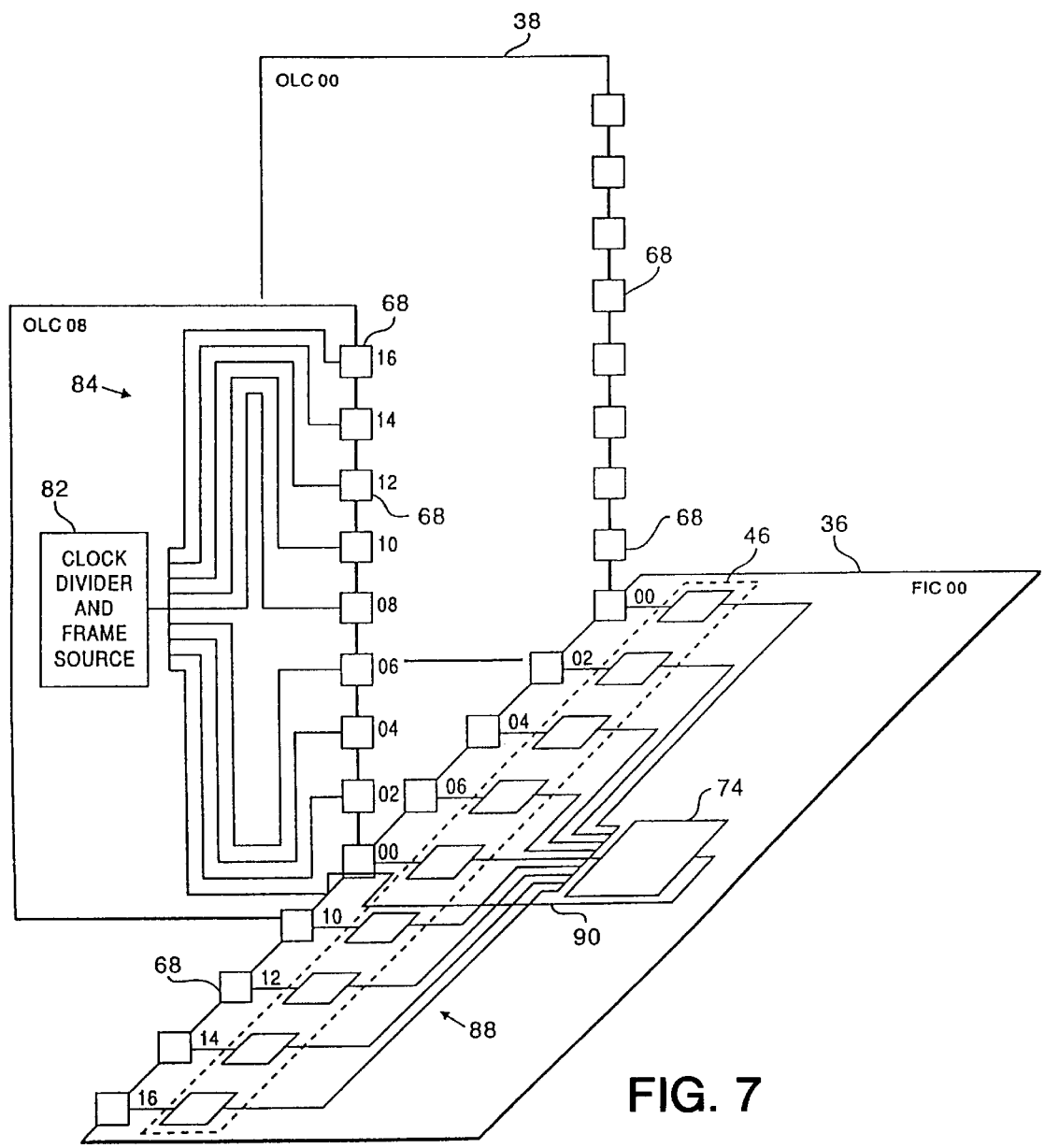
FIG. 7 shows a schematic representation of geometric compensation applied to reference clock signals in OLCs and FICs for downstream switching.
Figure 8:
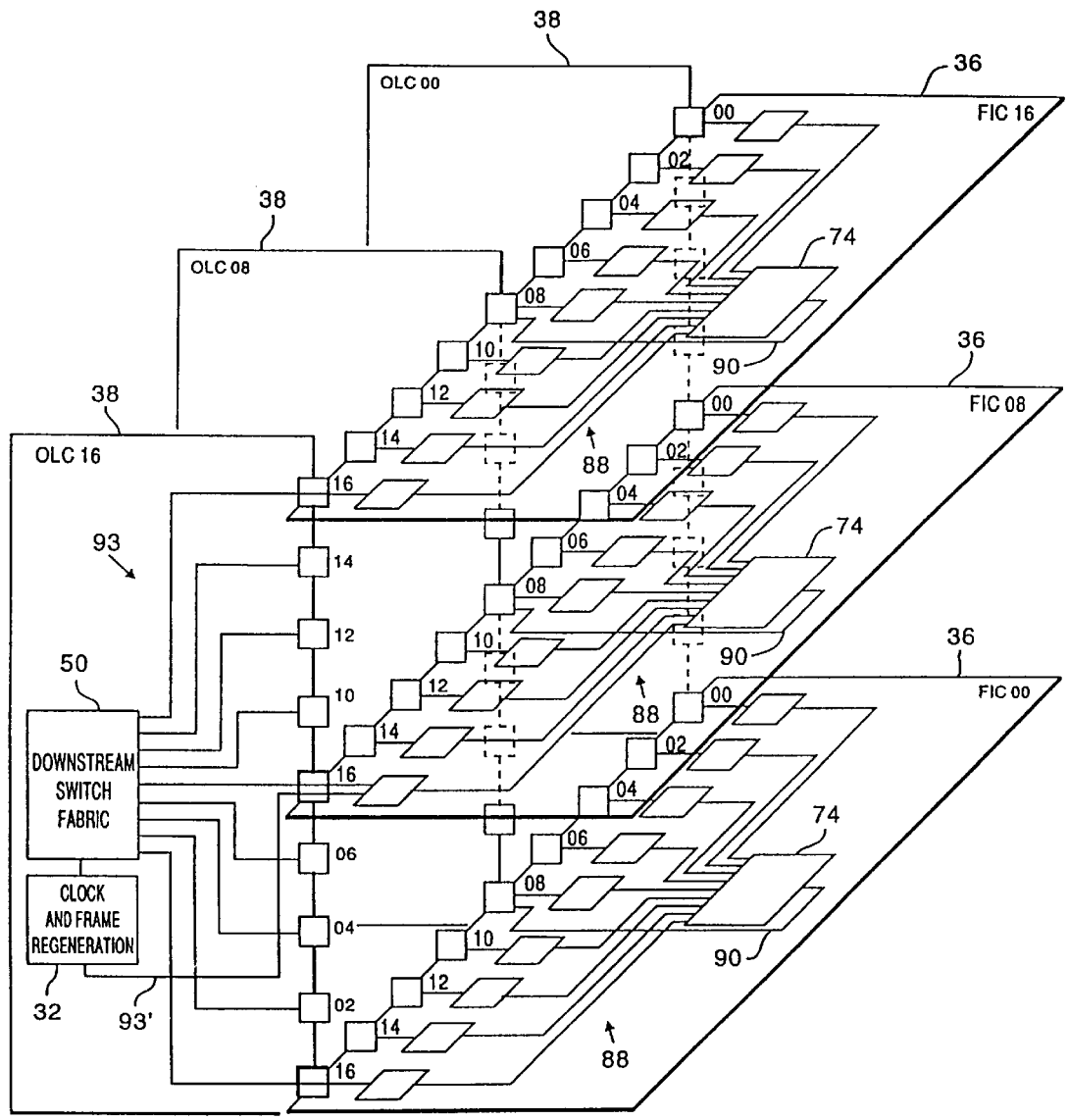
FIG. 8 shows a schematic representation of geometric compensation applied to data signals in FICs and OLCs for downstream switching.

FIGS. 7 and 8 show a schematic representation of geometric compensation applied to signals in OLCs 38 and FICs 36 for downstream switching. For the sake of clarity, FIGS. 7 and 8 omit a similar representation which is employed in reverse for upstream switching. However, those skilled in the art will appreciate that the below-presented discussion which applies to downstream switching applies in reverse to upstream switching.

The purpose of the geometric compensation is to align the reference clock to corresponding data so that a regenerated master clock will have the correct phase synchronization to appropriately clock data into second stage fabrics and subsequent latches. All data and reference clock signals are desirably transported through OLCs 38 and FICs 36 using a 50 ohm trace configuration. To preserve noise immunity and reduce power consumption, accessory source and/or destination termination networks are omitted. The data or reference clocks propagate through these signal paths at around the speed of light, and signal paths of varying lengths lead to propagation delays of varying duration.

A master clock source starts at a physical point within B-CSM 20 and is be distributed throughout B-CSM 20 to the various locations where it then mates with data. As discussed above, the master clock is first converted to a one-half frequency reference clock signal which is distributed throughout B-CSM 20, then regenerated. Due to the vast amount of data processed by B-CSM 20, these locations are spread throughout B-CSM 20, so that varying amounts of propagation delay may be experienced by reference clocks just in transporting the reference clocks to locations where they mate with data. Likewise, the data passing between first and second stage switch fabrics may traverse signal paths of varying lengths. Consequently, data streams being collected together in second stage switch fabrics may have different timing skews associated therewith.

FIG. 7 illustrates a B-CSM 20 configured to support up to 9 FICs 36 and up to 9 OLCs 38. Each OLC 38 and FIC 36 is referenced using an even suffix number in the range of 00–16. However, FIG. 7 shows only OLC-00 and OLC-08 with FIC-00 for clarity. OLCs are aligned so that OLC-08 is in the center of all OLCs. Each OLC includes clock divider and frame source circuit 82 (see FIG. 6) and signal path pattern 84, but circuit 82 and pattern 84 are active only on OLC-08. Pattern 84 distributes the clock source signal CS from clock divider and frame source circuit 82 to all junctor groups 68 through signal paths of varying lengths in pattern 84. In the version of pattern 84 illustrated in FIG. 7, the signal path to the center junctor group 68 for OLC-08 is the longest path, while the signal paths to the outside junctor groups 68 are the shortest signal paths.

Each FIC 36 includes a signal path pattern 90 and signal path pattern 88. Pattern 90 receives the clock source signal CS from OLC-08 via its center junctor group 68 and routes the clock source signal CS to clock divider and frame source circuit 74. Reference clocks which may be available at non-center junctor groups 68 on FICs 36 are ignored. Since FICs 36 are identical to one another, the reference clock follows equivalent length paths over path pattern 90 on all FICs 36. From clock and frame regeneration circuit 74, the clock source signal CS is distributed to all portions of downstream switch fabric 46 over signal path pattern 88. The downstream switch fabric 46 adds the data, and then the reference clock and data pass together from fabric 46 to junctor groups 68. Each FIC 36 has the same pattern 88.

FIG. 8 illustrates the same pattern 88 shown in FIG. 7 along with a pattern 93 residing on OLC cards 38. Pattern 84, discussed above in connection with FIG. 7 is omitted in FIG. 8 for clarity. Data from junctor groups 68 are routed to a downstream switch fabric 50 along signal paths of varying lengths following pattern 93. A reference clock from FIC-08 is routed using a signal pattern 93' to clock and frame regeneration circuit 32, which regenerates an aligned full-rate clock. At downstream switch fabric 50 the data are clocked into the switch fabric using the clock from clock and frame regeneration circuit 32. In the preferred embodiments, the delays of corresponding signal paths from patterns 84 and 93 approximately equal the same constant value for each junction group 68. The varying lengths of pattern 84 compensate for the varying lengths of pattern 93.

The clock path from clock divider and frame source circuit (see FIG. 6) 82 on OLC-08 (see FIG. 6) to the clock input at the downstream switch fabric 50 on a particular OLC 38 always includes patterns 84 on OLC-08, plus pattern 90 and 88 on FIC-08, plus pattern 93' on the particular OLC 38. The clock and data path from clock divider and frame source circuit 82 on OLC-08 to any data input at the downstream switch fabric 50 on a particular OLC 38 always includes patterns 84 on OLC-08, plus patterns 90 and 88 on the appropriate FIC 36, plus pattern 93 on the particular OLC.

Since the delays of the corresponding signal path from patterns 84 and 93' are always equal for each FIC, and since pattern 90 and 88 are the same on each FIC, the delays of all clock-only and clock and data paths are roughly equal.

Figure 9:
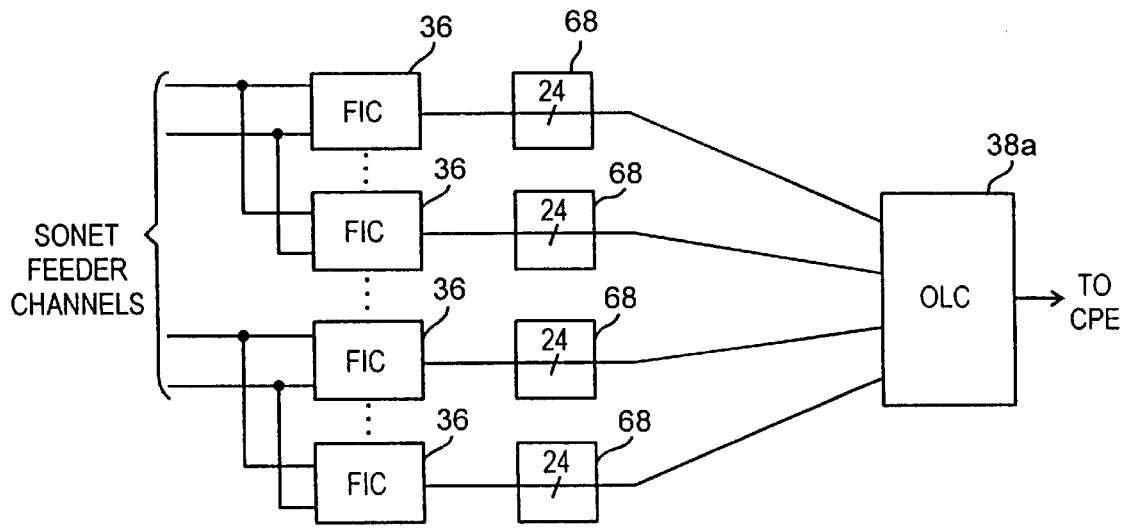
FIG. 9 shows an exemplary arrangement of a number of FICs coupled to an OLC.

FIG. 9 shows an exemplary arrangement of a number of FICs 36 coupled to an OLC 38a. In turn, OLC 38a couples with downstream lines to the CPE 14 that sent a switching request for a program. Although only one OLC 38a is illustrated, each FIC 36 is preferably coupled to a number of OLCs 38. As described above, the preferred embodiment includes eight FICs 36 and eight OLCs 38 connected through sixty-four junctor groups 68. For simplicity, each junctor group 68 is shown having twenty-four downstream junctors. However, junctor groups 68 may be alternatively configured to include a number of upstream junctors and/or bidirectional junctors (described below).

In the embodiment shown in FIG. 9, each SONET feeder channel is connected to a plurality of FICs 36. This arrangement enables B-CSM 20 to efficiently manage signal traffic by selecting an available input feeder channel and a junctor group 68 with low signal occupancy. In addition, this arrangement allows one or more FICs 36 to function as a back-up switching module if another FIC 36 should fail. Of course, the specific number of feeder channels and the number of feeder channels connected to each FIC 36 can vary according to the individual requirements of network 10.

Figure 10:
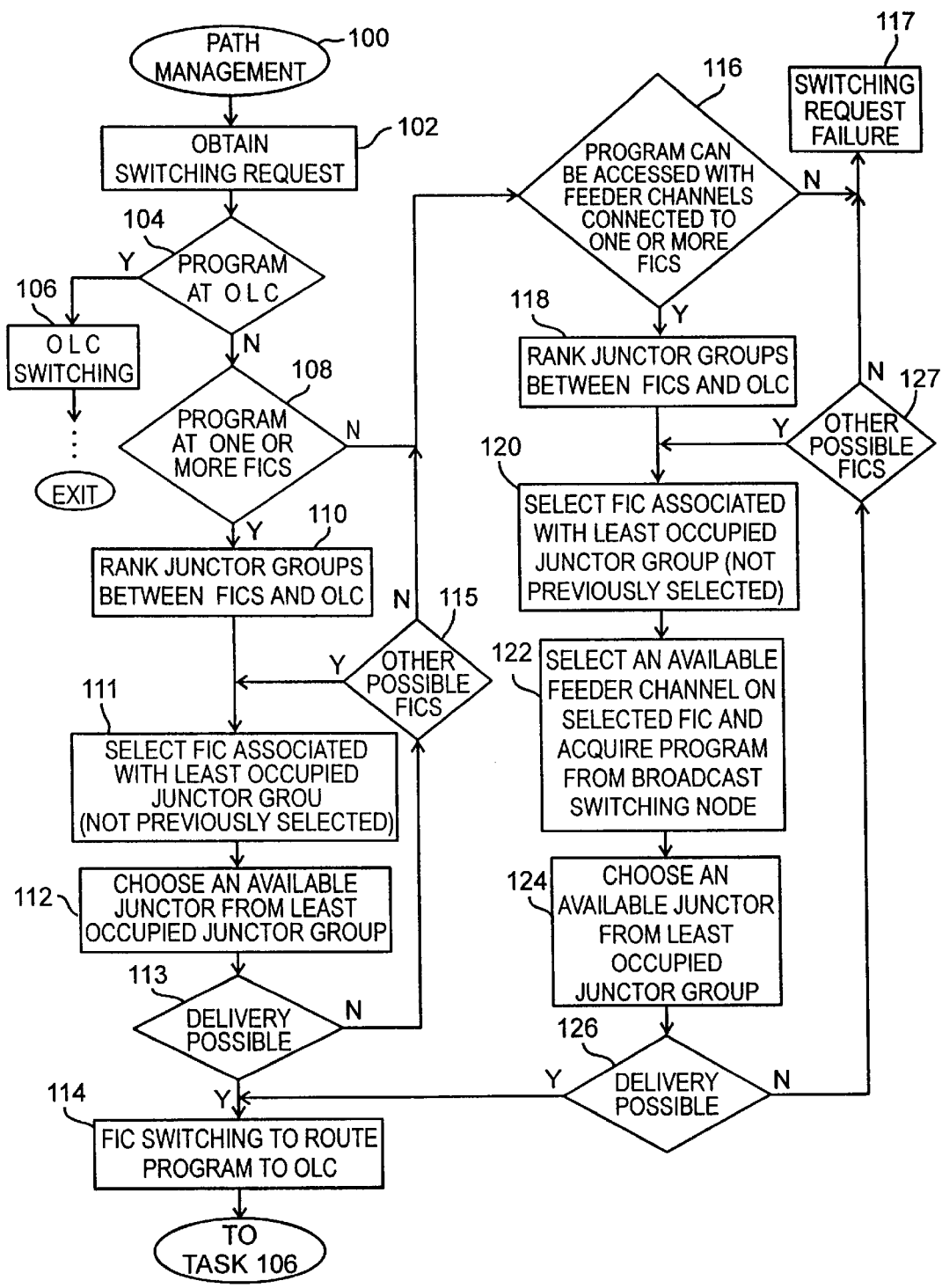
FIG. 10 shows a flow diagram of a path management process performed by the B-CSM.

FIG. 10 shows a flow diagram of a path management process 100 performed by B-CSM 20. Process 100 is performed when a customer desires to receive a specified program (such as a video program). Process 100 may be performed to establish a broadcast-like program at a CPE 14 or to establish a point-to-point connection (such as a video conference) between a CPE 14 and a remote site upstream from B-CSM 20. Although process 100 is described below in connection with the arrangement shown in FIG. 9, it may be applied in an equivalent manner to the arrangement shown in FIG. 4, where feeders are connected to only one FIC 36.

Path management process 100 begins with a task 102, which obtains a switching request for a particular video program. The switching request originates from a CPE 14 and is routed to one of the OLCs 38 at B-CSM 20. FIG. 9 depicts one OLC 38a because in the preferred embodiment each CPE 14 is associated with only one OLC 38. Thus, OLC 38a is associated with the switching request.

After task 102 obtains the switching request, a query task 104 determines whether the desired program is available at OLC 38a via a junctor. OLC processor 58 (see FIG. 4) monitors the programs currently connected to OLCs 38 and identifies the junctors that are carrying the respective programs. If query task 104 determines that the requested program is present at OLC 38a, then a task 106 is performed. During task 106, second stage switching is performed by OLC 38a such that a path is set up in OLC 38a from a junctor to the line channel connecting to CPE 14.

Following the second stage switching of task 106, process 100 continues with activities associated with signal path management until the particular program is no longer needed at the CPE 14 that is connected to OLC 38a. When the particular program is no longer needed, a disconnect process is initiated and the connection at OLC 38a is preferably torn down. The associated junctor is returned to an idle state, unless it is still in use for another connection, and can be occupied as required. For purposes of this description, a junctor is considered to be occupied when a signal is carried over it and idle when no signal is carried over it. In the preferred embodiment, video and other signals need not be connected to OLC 38a unless requested by a customer. Because the junctors are not unnecessarily occupied by unused signals, the likelihood of blocking is reduced and B-CSM 20 can efficiently process a large volume of signal traffic.

If, however, query task 104 determines that the requested video program is not present at OLC 38a, then a query task 108 tests whether the program has been received by any FICs 36. The program may be present at a FIC 36 if, for example, it is currently being carried by an OLC other than OLC 38a.

If one or more FICs 36 has received the desired program, a task 110 causes B-CSM 20 to rank junctor groups 68 between the FICs 36 and OLC 38a according to the occupancy of junctor groups. Task 110 may be performed by FIC processor 62 and/or OLC processor 58 (see FIG. 4). Task 110 may produce a ranked list of possible FICs 36, giving the highest priority to the least-occupied junctor group (the junctor group having the most free junctors) and giving the lowest priority to the most-occupied junctor group (the junctor group having the least free junctors). Task 110 may rank junctor groups 68 by analyzing current switching conditions monitored by FIC processor 62 and/or OLC processor 58.

In accordance with task 110, a task 111 selects junctor group 68 according to the ranked list. In the preferred embodiment, task 111 selects the least-occupied junctor group 68, i.e. the junctor group having the most idle junctors. Task 111 enables B-CSM 20 to reduce the probability of blocking by distributing signal traffic evenly among junctor groups 68.

After task 111, a task 112 causes B-CSM 20 to choose an idle junctor from the junctor group 68 selected in task 111. The chosen junctor is configured to deliver signals downstream as discussed below in connection with FIG. 12.

Following selection of an individual junctor in task 112, a query task 113 determines whether B-CSM 20 can deliver the program successfully to the requesting CPE 14. Due to processing and switching delays and the large volume of signal traffic flowing through B-CSM 20, the selected junctor on FIC 36 may become occupied before final switching is performed.

If task 113 verifies a possible delivery path, a task 114 sets up the path in the selected FIC 36 from a feeder channel with the desired program (see FIG. 9) to the chosen junctor. Task 114 then routes the video program from FIC 36 via the chosen downstream junctor to OLC 38a. During task 114, first stage switching may be performed at the FIC 36 associated with the selected junctor group 68. Once the program is obtained at OLC 38a, path management process 100 enters task 106 (described above) to perform second stage switching at OLC 38a, subsequent path management activities, and eventual disconnect.

If query task 113 determines that program delivery is not possible, then path management process 103 proceeds to a query task 115. Query task 115 determines if there is another possible FIC 36 from the ranked junctor groups of task 110. If there is another possible selection, program control loops back to tasks 111 and 112 to select an available FIC 36 and an individual junctor.

When query task 115 finds that there is not another possible FIC 36 available to select, path management process 100 proceeds to a query task 116 (described below).

Returning to query task 108, if the requested video program is not available at any FIC 36 or if query task 115 finds that there is not another possible FIC 36, then query task 116 determines if there is one or more FICs 36 associated with feeder channels that can access the desired program. When a program is not present at a FIC 36, B-CSM 20 may interact with one or more broadband switching nodes 18 (see FIG. 1) in an attempt to obtain the program. If no FICs 36 can access the desired program, then process 100 proceeds to a task 117. Task 117 initiates a process for a switching request failure.

If query task 116 finds FICs 36 associated with feeder channels that can access the desired program, then process 100 proceeds to a task 118. Task 118 ranks junctor groups 68 between FICs 36 according to occupancy. Task 118 may produce a ranked list of possible junctor groups on FICs 36 associated with feeder channels, giving the highest priority to the least-occupied junctor group (the junctor group having the most free junctors) and giving the lowest priority to the most-occupied junctor group (the junctor group having the least free junctors).

Following task 118, a task 120 preferably selects the least-occupied junctor group 68. Tasks 188 and 120 are similar to tasks 110 and 111, respectively, described above.

Following task 120, a task 122 selects an available feeder channel and acquires the desired program from upstream broadband switching node 18 (see FIG. 1) at the FIC 36 associated with junctor group 68 chosen in task 120. As described above in connection with FIGS. 2 and 9, a plurality of feeder channels may be connected to each FIC 36, and each feeder channel may be coupled to a plurality of FICs 36. Task 122 selects an unoccupied feeder channel and acquires the desired program at FIC 36 over the selected feeder channel. Task 122 may select the feeder channel in accordance with a ranking procedure similar to the ranking of junctor groups 68 described above.

Following task 122, a task 124 causes B-CSM 20 to choose an available junctor from the junctor group selected during task 120. Task 124 is similar to task 112 (described above). Following task 124, a query task 126 is performed.

Query task 126 determines whether B-CSM 20 can deliver the program successfully to the requesting CPE 14. As discussed previously, due to processing and switching delays and the large volume of signal traffic flowing through B-CSM 20, the selected feeder channel and/or the selected junctor may become occupied before final switching is performed. If query task 126 determines that program delivery is possible, then path management process 100 proceeds to task 114 for subsequent first stage switching, described above.

If, however, query task 126 determines that the requested video program cannot be delivered (e.g. the selected signal path is currently blocked), then path management process 100 proceeds to a query task 127. Query task 127 determines if there are other possible selections from the ranked junctor groups of task 118. If there is another possible selection, process 100 loops back to tasks 120, 122, and 124. Task 120 may then select another junctor group 68 according to the ranking performed in task 118, and task 122 may select an alternate feeder channel, if necessary. Process 100 may repeat tasks 120, 122, and 124 until the desired video program can be delivered according to the switching request obtained from the applicable CPE 14.

If query task 127 indicates that no other selections are possible, process 100 proceeds to task 117 to initiate a process for a switching request failure.

Figure 11:
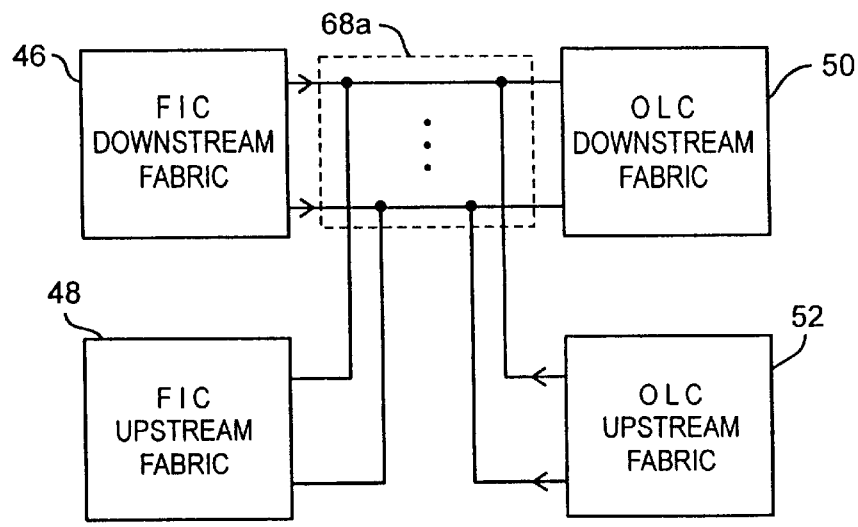
FIG. 11 shows a block diagram of a bidirectional junctor group.

FIG. 11 shows a block diagram of a bidirectional junctor group 68a according to an alternate embodiment of B-CSM 20. Each bidirectional junctor within junctor group 68a can carry downstream or upstream signals under the control of switch fabric control blocks 70 and 76 (see FIGS. 5–6). The bidirectional junctors are controlled such that the number of upstream junctors is responsive to the current volume of upstream signal traffic and the number of downstream junctors is responsive to the current volume of downstream signal traffic. Thus, the number of upstream and downstream junctors can vary as the services and requirements of network 10 evolve and change.

Each bidirectional junctor is coupled to FIC downstream fabric 46, FIC upstream fabric 48, OLC downstream fabric 50, and OLC upstream fabric 52. Each bidirectional junctor functions as a coupling node that interconnects fabrics 46, 48, 50, and 52. Thus, rather than having a fixed number of junctors devoted to upstream signals and a fixed number of junctors devoted to downstream signals, B-CSM 20 can have a number of bidirectional junctors that can be flexibly configured according to current traffic demands.

Figure 12:
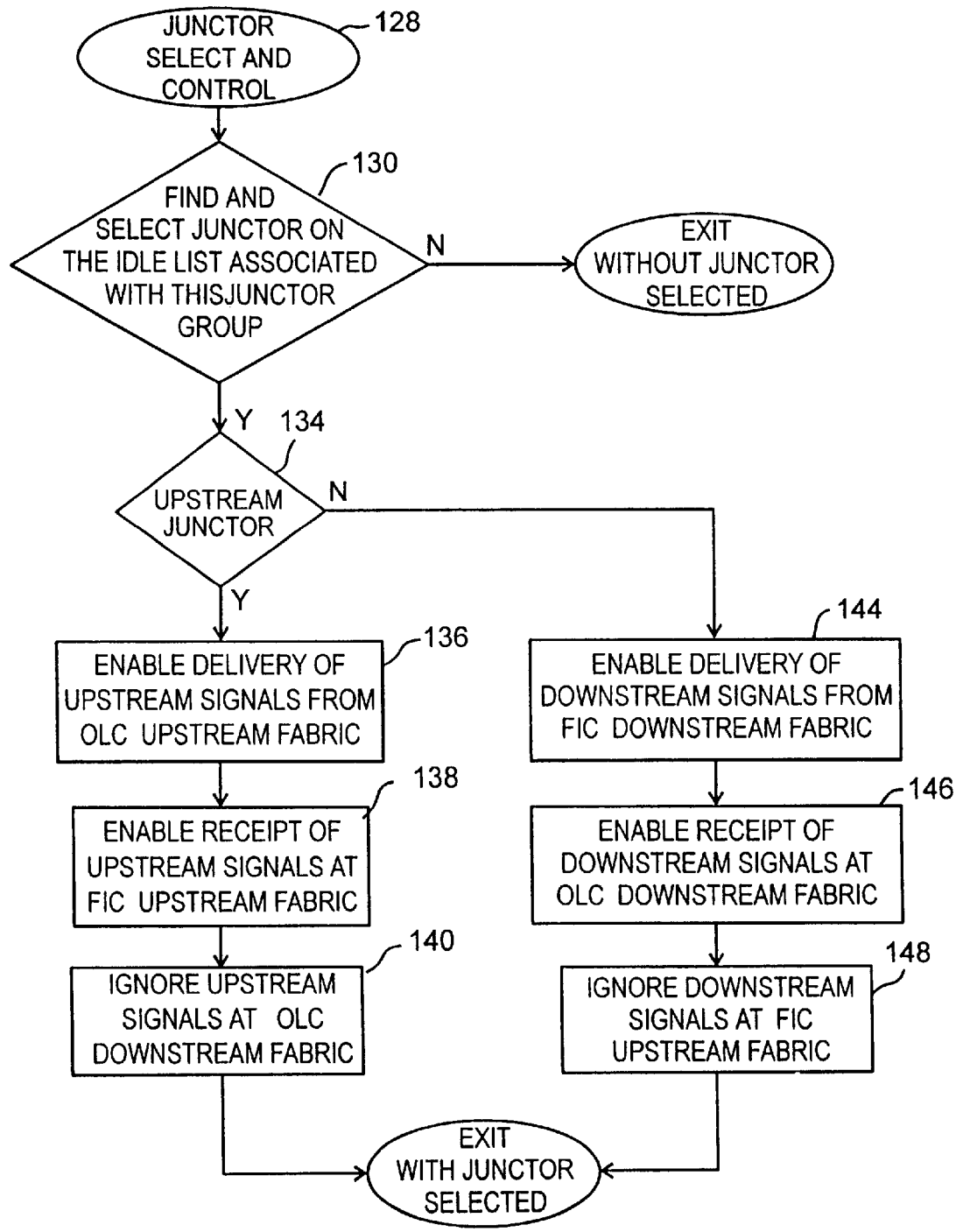
FIG. 12 shows a flow diagram of a junctor control process performed by the B-CSM.

Referring to FIG. 12, a junctor select and control process 128 is illustrated as a flow diagram. Process 128 is performed by B-CSM 20 and provides a means to monitor, select, and then control the directionality of each of the bidirectional junctors (see FIG. 11) in each of the bidirectional junctor groups 68a. Process 128 is performed whenever B-CSM 20 needs an upstream or downstream junctor so that communication signals will be directed through a junctor in response to upstream or downstream traffic volume. In other words, process 128 monitors upstream and downstream signal traffic volume so that the number of upstream junctors is responsive to the volume of upstream signal traffic, and the number of downstream junctors is responsive to the volume of downstream traffic.

Process 128 begins with a query task 130, which finds and selects a junctor on the idle list associated with this junctor group. The idle list includes the junctors that are not being used for either upstream or downstream traffic. In query task 130, if a junctor cannot be found on the idle list, i.e., there are no idle junctors, then junctor select process 128 exits without selecting a junctor. Task 130 may be performed by FIC processor 62 and/or OLC processor 58. During task 130, processors 62 and 58 may, for example, access signal traffic data stored at B-CSM 20 or analyze current status tables generated by B-CSM 20 or by network 10.

If query task 130 finds and selects an available junctor from junctor group 68a (see FIG. 11), then program control proceeds to a query task 134. Query task 134 determines if an upstream junctor is desired.

If an upstream junctor is desired, process 128 proceeds to a task 136. Task 136 enables delivery of upstream signals from OLC upstream fabric 52 to FIC 36. In the preferred embodiment depicted in FIG. 11, OLC upstream fabric 52 is devoted to driving upstream signals to FIC 36.

In addition to task 136, a task 138 enables receipt of upstream signals at FIC upstream fabric 48 and a task 140 causes OLC downstream fabric 50 to ignore any upstream signals that may be arriving from ONU 22 (see FIG. 1). OLC downstream fabric 50 may include tri-state switching elements that selectively block upstream traffic when the junctor is configured as an upstream junctor. Alternatively, OLC processor 58 may selectively disable downstream switching fabric elements at which any upstream signals appear. Following task 140, a B-CSM 20 will be able to direct upstream communication signals through the junctor as necessary, and process flow exits process 128 with an upstream junctor selected.

If query task 134 determines that an upstream junctor is not required, then it logically follows that a downstream junctor is desired, and process 128 proceeds to a task 144. Task 144 enables delivery of downstream signals from FIC downstream fabric 46 to OLC 38. FIC downstream fabric 46 is preferably devoted to driving downstream signals to OLC 38. In addition to task 144, a task 146 enables receipt of downstream signals at OLC downstream fabric 50 and a task 148 causes FIC upstream fabric 48 to ignore any downstream signals that may be arriving from BSN 18 (see FIG. 1). Steps 144, 146, and 148 are analogous to steps 136, 138, and 140, respectively. After task 148, a B-CSM 20 will be able to direct downstream communication signals through the junctor as necessary. For example, a downstream junctor may be required to carry a video channel as described in path management process 100 described previously. Following task 148, junctor control process 128 exits with a downstream junctor selected.

Process 128 is repeated periodically for each junctor group 68a to ensure that the bidirectional junctors are efficiently selected and controlled according to upstream and downstream traffic. Bidirectional junctor groups 68a, under the control of process 128, enable B-CSM 20 to efficiently handle signal traffic utilizing a realistic and manageable number of FICs 36 and OLCs 38.

Following process 128, and in response to changing upstream and downstream signal traffic needs, a junctor release process (not shown) may be performed. The junctor release process responds to instructions from B-CSM 20 (FIG. 2) to stop delivering either upstream or downstream signal traffic an individual junctor of junctor group 68a. Once signal delivery has stopped, the junctor is returned to the idle list for junctor group 68a (previously described).

In summary, the present invention provides an improved broadband network switch that efficiently supports a variety of communication services. The broadband switch is capable of adapting to large or rapid variations in upstream and downstream signal traffic volume. The broadband switch utilizes flexible switching circuits and switching processes to allocate upstream and downstream switching circuits according to upstream and downstream traffic demand. The broadband switch efficiently manages and distributes signal traffic through the broadband switch to reduce the probability of signal blocking.

The present invention has been described above with reference to preferred embodiments. However, those skilled in the art will recognize that changes and modifications may be made in these preferred embodiments without departing from the scope of the present invention. For example, the precise configuration of the preferred embodiments are discussed above for the sake of illustration, and those skilled in the art will recognize that the present invention can encompass a wide variety of configurations not specifically discussed herein. Moreover, the present invention is not limited to just the signals discussed herein. For example, SONET framing signals may be distributed with clock signals in the manner discussed above. These and other changes and modifications which are obvious to those skilled in the art are intended to be included within the scope of the present invention.

What is claimed is:

1. A method of operating a switching circuit to manage communication signal traffic, said method comprising the steps of:
   performing first stage switching in a first plurality of switching modules;
   performing second stage switching in a second plurality of switching modules, wherein each of said first switching modules is coupled to all of said second switching modules and said first and second switching modules are in data communication through a plurality of junctors, a portion of said junctors being configured as bidirectional junctors;
   monitoring upstream and downstream signal traffic volume;
   controlling, in response to said monitoring step, a number of said bidirectional junctors allocated to upstream signal traffic and a number of said bidirectional junctors allocated to downstream signal traffic; and
   directing communication signals through said bidirectional junctors in response to said upstream and downstream signal traffic volume.

2. A method as claimed in claim 1, wherein said junctors are arranged in a plurality of junctor groups and said method further comprises the steps of:
   receiving one of said communication signals at one of said first switching modules;
   ranking said junctor groups according to junctor occupancy;
   selecting one of said junctor groups in response to said ranking step; and
   routing said one communication signal through said selected junctor group to one of said second switching modules.

3. A method as claimed in claim 1, wherein said controlling step controls said bidirectional junctors such that said number of said bidirectional junctors allocated to upstream signal traffic is responsive to the volume of upstream signal traffic and said number of said bidirectional junctors allocated to downstream signal traffic is responsive to the volume of downstream signal traffic.

4. A method as claimed in claim 1, wherein each of said bidirectional junctors is coupled to a first upstream fabric located at said first switching module, a first downstream fabric located at said first switching module, a second upstream fabric located at said second switching module, and a second downstream fabric located at said second switching module, and said method further comprises the steps of:
   delivering downstream signals from said first downstream fabric to said second switching module via one of said bidirectional junctors;
   delivering upstream signals from said second upstream fabric to said first switching module via one of said bidirectional junctors;
   receiving said downstream signals at said second downstream fabric when said one bidirectional junctor is configured as a downstream junctor; and
   receiving said upstream signals at said first upstream fabric when said one bidirectional junctor is configured as an upstream junctor.

5. A method as claimed in claim 4, further comprising the steps of:
   ignoring said downstream signals at said first upstream fabric when said one bidirectional junctor is configured as said downstream junctor; and
   ignoring said upstream signals at said second downstream fabric when said one bidirectional junctor is configured as said upstream junctor.

6. A method for operating a broadband video switching circuit to manage communication signal traffic, said method comprising the steps of:
   performing first stage switching in a first plurality of switching modules;
   performing second stage switching in a second plurality of switching modules, wherein each of said first switching modules is coupled to all of said second switching modules and said first and second switching modules are in data communication through a plurality of junctor groups;
   ranking said junctor groups according to junctor occupancy; and
   selecting one of said junctor groups to carry a communication signal, said selecting step being responsive to said ranking step.

7. A method as claimed in claim 6, wherein said junctor groups include a plurality of bidirectional junctors and said method further comprises the steps of:
   monitoring upstream and downstream signal traffic volume; and
   controlling, in response to said monitoring step, a number of bidirectional junctors allocated to upstream signal traffic and a number of bidirectional junctors allocated to downstream signal traffic.

8. A method as claimed in claim 6, wherein said selecting step selects a relatively low-occupancy junctor group over a relatively high-occupancy junctor group.

9. A method as claimed in claim 6, wherein:
   each of said junctor groups includes a plurality of individual junctors; and said method further comprises the step of choosing, from said selected junctor group, one of said individual junctors to carry said communication signal.

10. A method as claimed in claim 9, further comprising the step of routing said communication signal from one of said first switching modules to one of said second switching modules via said one individual junctor.

11. A method as claimed in claim 6, further comprising the steps of:

obtaining a switching request for said communication signal, said switching request originating from a customer site; and determining whether said communication signal is available at said first and second switching modules.

12. A method as claimed in claim 11, wherein each of said first switching modules is connected to a plurality of feeder channels and said method further comprises the steps of:

selecting one of said feeder channels when said communication signal is not available at said first and second switching modules; and acquiring, at one of said first switching modules, said communication signal over said one feeder channel.

13. A method as claimed in claim 6, further comprising the steps of:

determining whether said communication signal can be delivered according to a switching request; and repeating said selecting step for different ones of said junctor groups until said communication signal can be delivered according to said switching request.

14. A method as claimed in claim 13, wherein each of said first switching modules is connected to a plurality of feeder channels and said method further comprises the steps of:

selecting one of said feeder channels to acquire said communication signal at one of said first switching modules; and repeating said feeder channel selecting step until said communication signal can be delivered according to said switching request.

15. A broadband switching circuit that manages communication signal traffic, said switching circuit comprising:

a plurality of first switching modules;

a plurality of second switching modules, each of said first switching modules being coupled to all of said second switching modules;

a plurality of junctors configured to provide data communication between said first and second switching modules, a portion of said junctors being configured as bidirectional junctors, each of said bidirectional junctors being coupled to a first upstream fabric located at said first switching module, a first downstream fabric located at said first switching module, a second upstream fabric located at said second switching module, and a second downstream fabric located at said second switching module; and means for directing communication signals through said junctors in response to upstream and downstream signal traffic volume.

16. A switching circuit as claimed in claim 15, further comprising a plurality of feeders, each of which is coupled to at least two of said first switching modules, wherein said feeders are configured to provide data to said first switching modules.

17. A switching circuit as claimed in claim 15, further comprising:

means for monitoring said upstream and downstream signal traffic volume; and means for controlling said bidirectional junctors such that a number of said bidirectional junctors is responsive to said upstream signal traffic volume and a number of said bidirectional junctors is responsive to said downstream signal traffic volume.

18. A switching circuit as claimed in claim 15, wherein for each of said bidirectional junctors:

said first downstream fabric is configured to deliver downstream signals;

said second upstream fabric is configured to deliver upstream signals;

said second downstream fabric is configured to receive said downstream signals when said bidirectional junctor is configured as a downstream junctor; and said first upstream fabric is configured to receive said upstream signals when said bidirectional junctor is configured as an upstream junctor.

19. A switching circuit as claimed in claim 18, wherein:

said first upstream fabric is configured to ignore said downstream signals when said bidirectional junctor is configured as said downstream junctor; and said second downstream fabric is configured to ignore said upstream signals when said bidirectional junctor is configured as said upstream junctor.

20. A broadband switching circuit that manages communication signal traffic, said switching circuit comprising:

a plurality of first switching modules;

a plurality of second switching modules, each of said first switching modules being coupled to all of said second switching modules;

a plurality of junctors configured to provide data communication between said first and second switching modules, said junctors being arranged in a plurality of junctor groups;

means for ranking said junctor groups according to junctor occupancy;

means for selecting one of said junctor groups to carry a communication signal, said means for selecting being responsive to said junctor occupancy; and means for directing said communication signal through said one of said junctors in said selected one of said junctor groups in response to upstream and downstream signal traffic volume.

* * * * *